United States Patent
Endoh (10) Patent No.: US 6,587,265 B1
(45) Date of Patent: Jul. 1, 2003

(54) PRIME FOCUS UNIT

(75) Inventor: Makoto Endoh, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/515,883

(22) Filed: Feb. 29, 2000

(30) Foreign Application Priority Data

Nov. 25, 1999 (JP) ............................................. 11-334513

(51) Int. Cl.[7] .............................................. G02B 23/00
(52) U.S. Cl. ...................... 359/429; 359/399; 359/363; 250/203.1
(58) Field of Search ................................. 359/429, 430, 359/364, 728, 363, 399; 396/432; 343/832, 878, 880, 882, 761; 248/274.1; 250/203.1, 203.3, 203.4, 203.6

(56) References Cited

U.S. PATENT DOCUMENTS

| | | | | |
|---|---|---|---|---|
| 3,614,239 A | * | 10/1971 | Kissell | ................... 250/203.1 |
| 4,080,042 A | * | 3/1978 | Hornschu et al. | ........... 359/416 |
| 4,718,753 A | * | 1/1988 | Gebelein | .................... 359/364 |
| 4,798,949 A | * | 1/1989 | Wilcox et al. | ........... 250/203.6 |
| 4,988,244 A | * | 1/1991 | Sheldon et al. | ............. 248/631 |
| 5,901,936 A | * | 5/1999 | Bieg | .......................... 248/370 |
| 6,084,373 A | * | 7/2000 | Goldenberg et al. | ... 318/568.11 |

* cited by examiner

*Primary Examiner*—Mark A. Robinson
(74) *Attorney, Agent, or Firm*—Rothwell, Figg, Ernst & Manbeck (57) ABSTRACT

A prime focus unit that enables position and angle correction within a lens barrel while being located at the prime focus of a telescope. There is provided a first frame on which a barrel top inner tube of a telescope is to be mounted. A second frame is joined to the first frame by way of a Stewart platform comprising six jacks and three pressurized springs. An observation apparatus for collecting observation data and an optical correction system for effecting optical correction are provided on the second frame. If a change arises in the relative position and angle formed between the telescope and the observation apparatus in association with a change in the attitude of the telescope, the change can be eliminated by adjustment of a Stewart platform.

3 Claims, 6 Drawing Sheets

PRIME FOCUS UNIT

BACKGROUND OF THE INVENTION

1. Field of the Invention

The present invention relates to a prime focus unit, and more particularly, to a prime focus unit suitable for use as an apparatus for effecting observation at the prime focus of a large telescope.

2. Description of the Background Art

Figure 6:
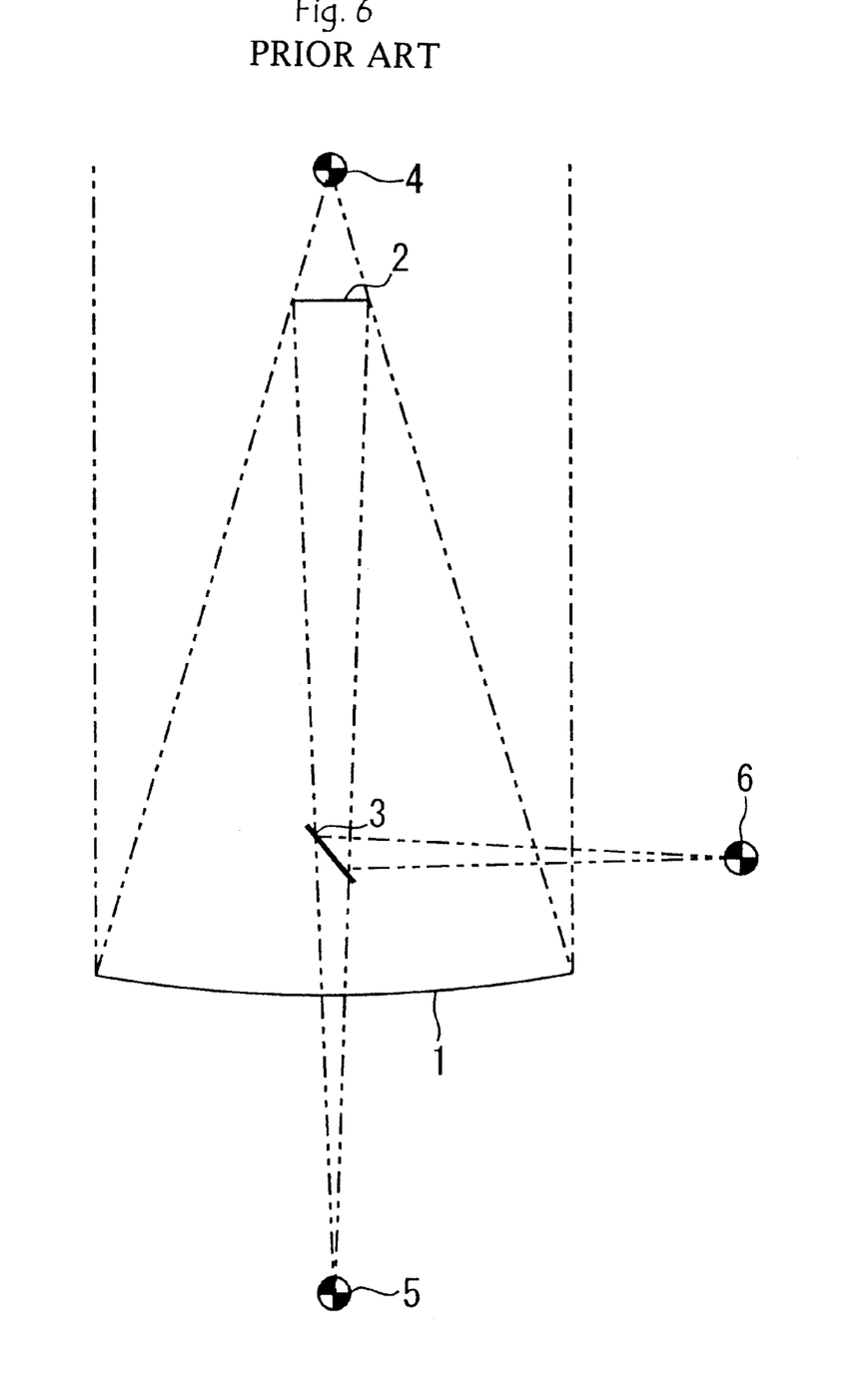
FIG. 6 is a conceptual diagram for describing a generic structure of an optical system of a telescope

FIG. 6 is a conceptual diagram for describing the structure of an optical system of a telescope. Reference numeral 1 designates a primary mirror; 2 designates a secondary mirror; and 3 designates a tertiary mirror. Further, reference numeral 4 designates a prime focus; 5 designates a Cassegrain focus; and 6 designates a Nasmyth focus.

The primary mirror 1 reflects light originating from stars and entering a telescope. In a case where the secondary mirror 2 is not provided, the light reflected from the primary mirror 1 forms an image at the prime focus 4. In a case where the secondary mirror 2 is provided, the light reflected from the primary mirror 1 is reflected by the secondary mirror 2 before forming an image at the prime focus. The secondary mirror 2 is disposed such that the light reflected from the secondary mirror 2 forms an image at a predetermined point behind the telescope. The predetermined point; that is, a point at which the light reflected from the secondary mirror 2 forms an image, corresponds to the Cassegrain focus. In a case where the tertiary mirror 3 is disposed, the axis of the light reflected from the secondary mirror 2 is bent at 90° by the tertiary mirror 3. The Nasmyth focus 6 corresponds to a point at which the light whose axis is bent forms an image to the side of the telescope.

In a case where an observation apparatus for observing light originating from stars is disposed at the prime focus 4, the light originating from stars is shielded by the observation apparatus, thus raising a problem of substantially diminishing the effective aperture of the telescope. To prevent such a problem, the observation apparatus is usually disposed at the Cassegrain focus 5 or at the Nasmyth focus 6.

However, in the case of the large telescope, a decrease in the effective aperture of the telescope, which would be caused by the observation apparatus being disposed at the prime focus 4, can be substantially ignored. In a case where the observation apparatus is disposed at the prime focus 4, a wider view angle of observation can be ensured as compared with the case where the observation apparatus is disposed at the Cassegrain focus 5 or at the Nasmyth focus 6. Thus, a configuration in which an observation apparatus is disposed at the prime focus 4 can be considered a practical configuration for a large telescope.

In a conceivable configuration of a large telescope in which an observation apparatus is disposed at the prime focus 4, the observation apparatus is fixed within a lens barrel of the telescope through use of; for example, members possessing rigidity. The attitude of the lens barrel is changed according to the position of a star that is an object of observation. If the observation apparatus is fixed within the lens barrel, the direction in which the weight of the observation apparatus acts on the lens barrel is changed according to the attitude of the lens barrel.

If the direction in which the weight of the observation apparatus acts on the lens barrel is changed, deformation corresponding to the change arises in the rigid members and the lens barrel that retain the observation apparatus. In the event of a change in the position or angle of the observation apparatus, observation conditions of the observation apparatus are also changed. Accordingly, depending on the structure for fixing the observation apparatus within the lens barrel, light originating from stars cannot be stably and accurately observed at all times.

SUMMARY OF THE INVENTION

The present invention has been conceived to solve the foregoing drawback in the background art and is aimed at providing a prime focus unit which enables position and angle correction within a lens barrel, as required, while being located at the prime focus of a telescope.

The above objects of the present invention are achieved by a prime focus unit for collecting observation data at the prime focus of a telescope. The unit includes a first frame fixed on the telescope. The unit also includes an observation apparatus for collecting the observation data. A second frame is provided so that the observation apparatus is to be mounted thereon. An adjustment mechanism is interposed between the first and second frames so as to adjust the relative position and angle therebetween.

Other objects and further features of the present invention will be apparent from the following detailed description when read in conjunction with the accompanying drawings.

DESCRIPTION OF THE PREFERRED EMBODIMENTS

In the following, principles and embodiments of the present invention will be described with reference to the accompanying drawings. The members and steps that are common to some of the drawings are given the same reference numerals and redundant descriptions therefor may be omitted.

Embodiment 1

Figure 1A:
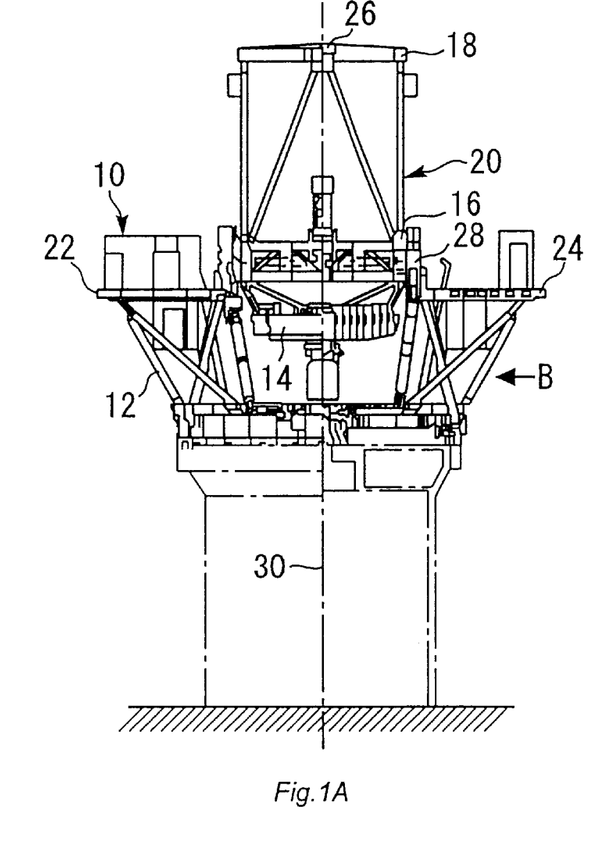
FIG. 1A is a front view showing a large telescope equipped with a prime focus unit according to a first embodiment of the present invention.
Figure 1B:
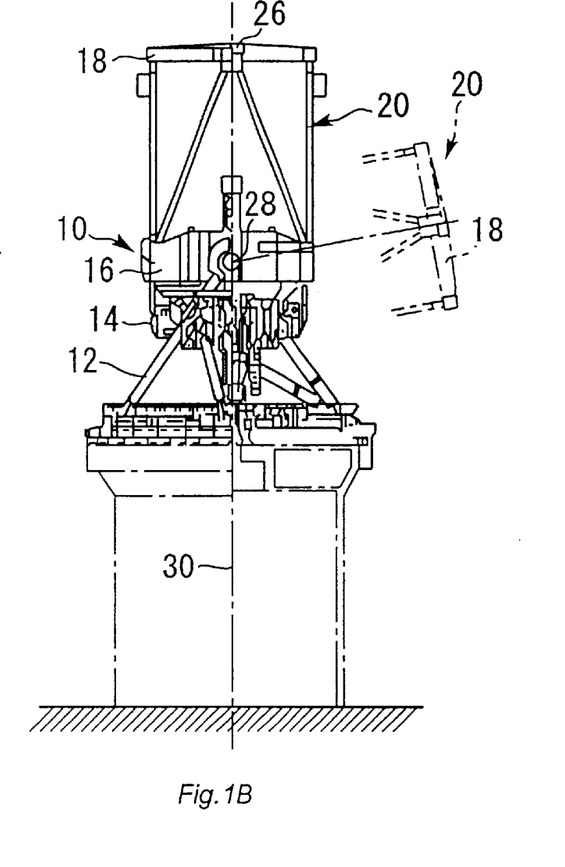
FIG. 1B is a side view showing the telescope, as viewed from arrow B shown in FIG. 1A.

FIG. 1A is a front view showing a large telescope 10 equipped with a prime focus unit according to a first embodiment of the present invention. FIG. 1B is a side view showing the telescope 10, as viewed from arrow B shown in FIG. 1A. The telescope 10 has a frame section 12 formed from a plurality of rigid members. A telescope main unit 20 comprising a primary mirror section 14, a lens barrel 16, and a barrel top 18 is mounted on the frame section 12.

The primary mirror section 14 houses the primary mirror 1 shown in FIG. 6. The tertiary mirror 3 shown in FIG. 6 is disposed within the lens barrel 16. As shown in FIG. 1A, an optical Nasmyth section 22 and an infrared Nasmyth section 24 are provided on opposite sides of the lens barrel 16. A barrel top inner tube 26 is provided in the barrel top 18 so as to be situated at a position slightly below the prime focus of the telescope 10. So long as a secondary mirror 2 (omitted from FIG. 1) such as that shown in FIG. 6 is disposed below the barrel top inner tube 26, the light originating from stars can be guided to the Nasmyth sections 22 and 24.

The telescope main unit 20 can be rotated about an elevation axis 28 serving as the axis of rotation. The barrel top 18 designated by a chain line in FIG. 1B shows the state of the telescope main unit 20 which has been rotated through only a predetermined angle about the elevation axis 28 serving as the axis of rotation. The telescope main unit 20 can also be rotated about an azimuth axis 30 serving as the axis of rotation, in conjunction with the frame section 12 and the Nasmyth sections 22 and 24. The telescope 10 can be oriented at a desired observation elevation and a desired observation azimuth by rotation of the telescope main unit 20 in the manner as mentioned above.

Figure 2A:
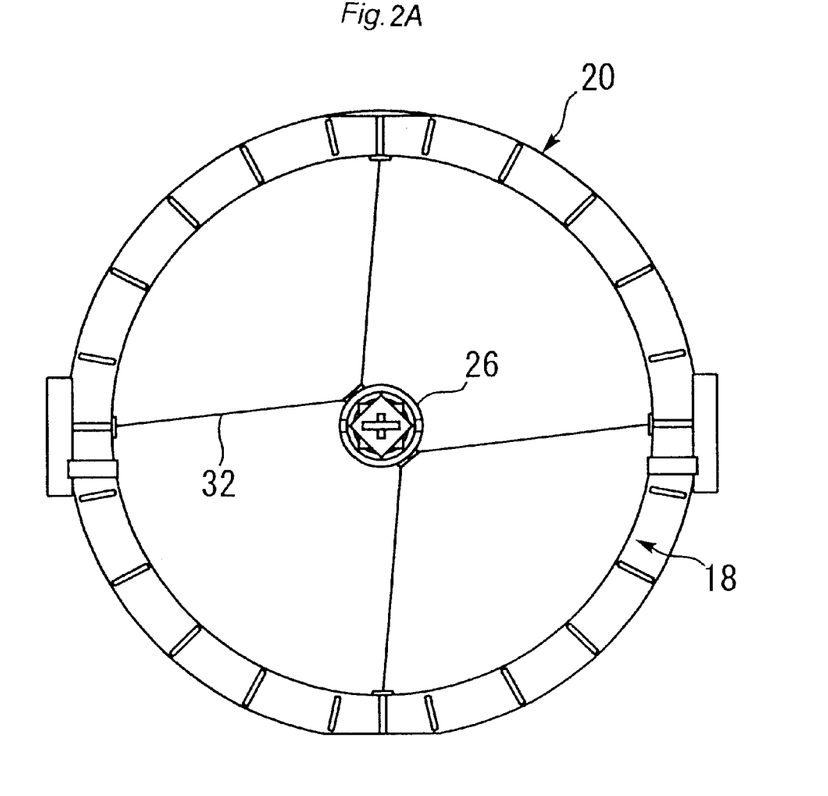
FIG. 2A is an enlarged plan view showing a barrel top of the telescope shown in FIG. 1.
Figure 2B:
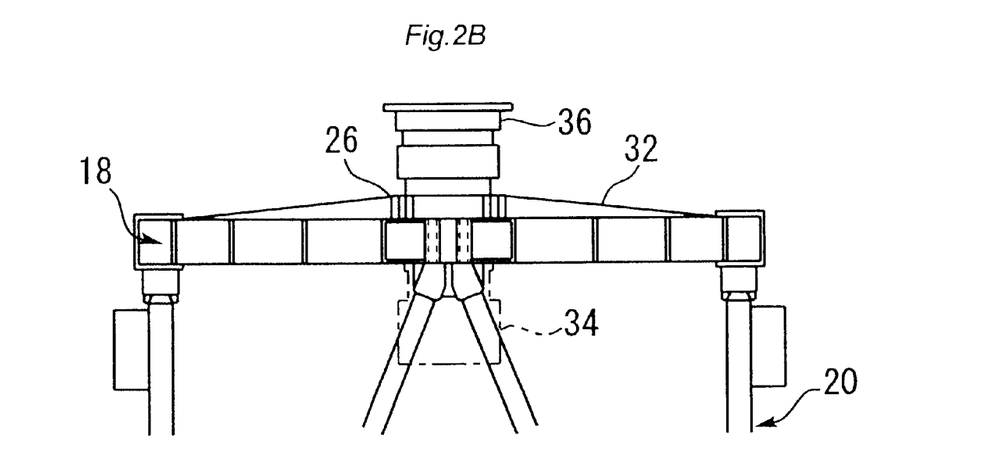
FIG. 2B is an enlarged side view showing the barrel top.

FIG. 2A is an enlarged plan view showing the barrel top 18, and FIG. 2B is an enlarged side view showing the barrel top 18. The barrel top inner tube 26 is retained stationary at the center of the barrel top 18 by way of barrel top spiders 32. As indicated by a chain line shown in FIG. 2B, a secondary optical mirror unit 34 (housing therein the secondary mirror 2) can be attached to the barrel top inner tube 26. As indicated by a solid line in FIG. 2B, a prime focus unit 36 of the embodiment can be attached to the barrel top inner tube 26. The prime focus unit 36 is a unit for observing light originating from stars at the prime focus of the telescope 10. Either the secondary optical unit 34 or the prime focus unit 36 can be selectively attached to the telescope 10. Hereinafter, there will be described a case where the prime focus unit 36 is attached to the telescope 10.

Figure 3A:
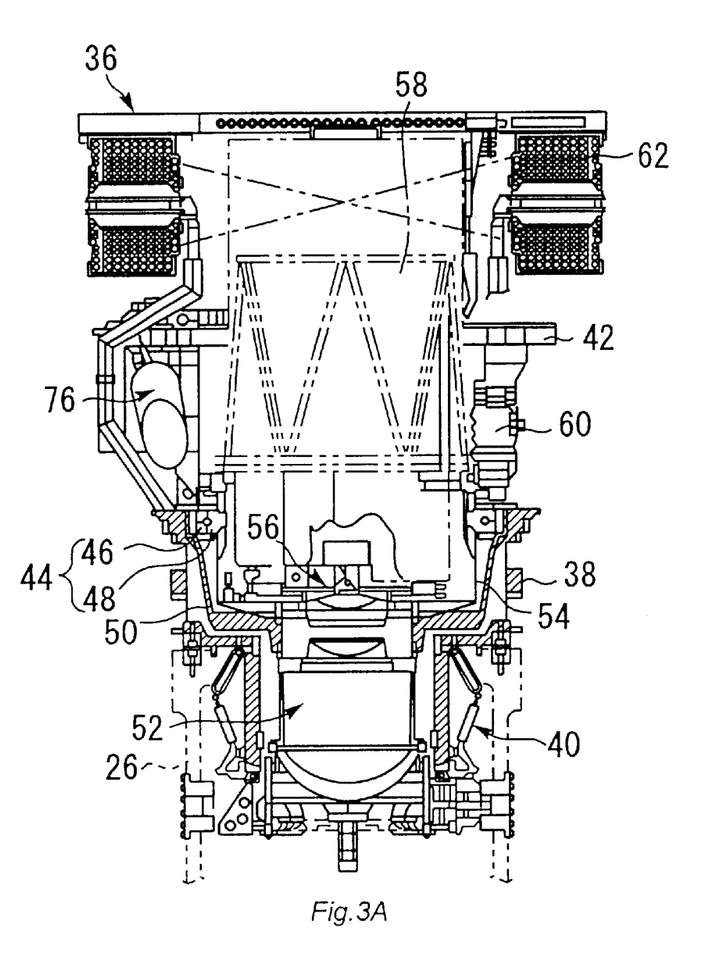
FIG. 3A is a cross-sectional view of a prime focus unit equipped to the telescope shown in FIG. 1.
Figure 3B:
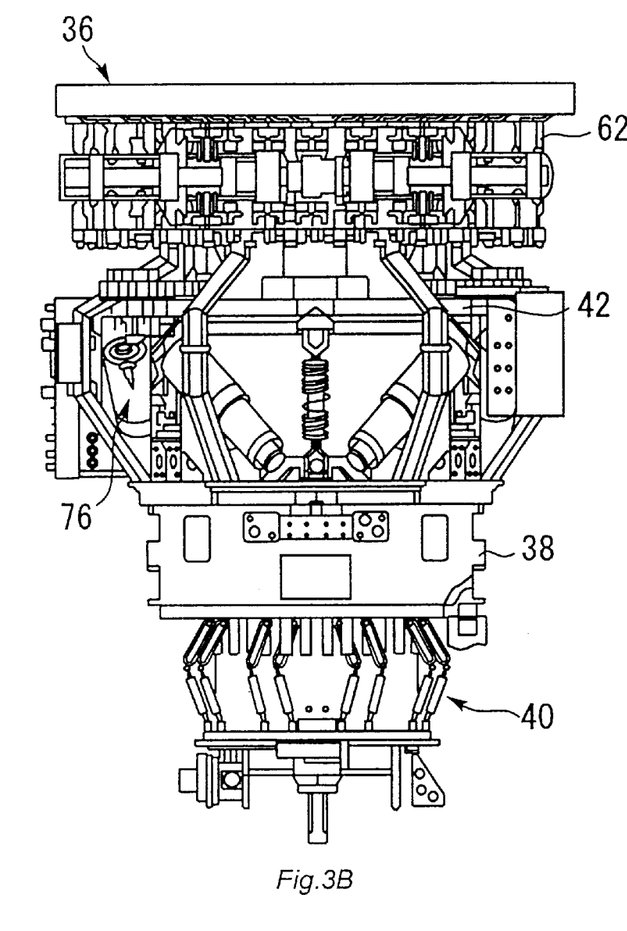
FIG. 3B is a back view of the prime focus unit.

FIG. 3A is a cross-sectional view of the prime focus unit 36, and FIG. 3B is a back view of the prime focus unit 36. The prime focus unit 36 is equipped with a first frame 38. A clip mechanism 40 is attached to the first frame 38. The clip mechanism 40 comprises an arm mechanism that engages with predetermined positions on the barrel top inner tube 26, and a motor mechanism for actuating the arm mechanism. The prime focus unit 36 is fixed in the barrel top tube 26 by activation of the motor mechanism.

The prime focus unit 36 is equipped with a second frame 42 corresponding to a cylindrical member whose upper end is flanged. An outer ring 46 of a pivot bearing 44 is attached to the lower end of the second frame 42. An inner ring 48 of the pivot bearing 44 can freely rotate relative to the outer ring 46; that is, the second frame 42.

The lower end of the second frame 42 is fixed to an optical correction system support frame 50 retaining at the center thereof an optical correction system 52 for use with the prime focus unit 36. The optical correction system 52 is constituted by combination of a plurality of optical lenses and performs optical correction effective for improving observation accuracy within the prime focus unit 36, such as correction of the focal length of the prime focus unit 36.

An auto-guider support frame 54 is fixed to the inner ring 48 of the pivot bearing 44 and retains an auto-guider 56 for tracking a star that is an observation target. The auto-guider 56 has a mirror for bending the axis of the light that has originated from a star and has passed through the optical correction system 52, and a camera for photographing the light bent by the mirror. In a case where a known star whose orbit has already been ascertained is situated close to an observation target, the camera of the auto-guider 56 captures the known star, and the observation elevation and observation azimuth are controlled on the basis of the location of the known star within an observation screen. Through such a control operation, the telescope 10 accurately tracks the observation target.

An observation apparatus 58 is fixed to the inner ring 48 of the pivot bearing 44. The observation apparatus 58 receives the light that has passed through the optical correction system 52 and forms an image at the prime focus of the telescope 10. In a case where, in the observation apparatus 58, the axis of the light that has passed through the optical correction system 52 is accurately aligned with the axis of the observation apparatus 58, and where the focus of the light accurately matches the three-dimensional position of the observation apparatus 58, an image can be accurately formed at the prime focus. The image formed in the observation apparatus 58 is output to an unillustrated monitor by way of an output cable, and by way of the monitor an observer can view the observation screen captured by the telescope 10.

An instrument rotator 60 is attached to the second frame 42. The instrument rotator 60 is a mechanism for rotating the auto-guider 56 and the observation apparatus 58, which are retained by the inner ring 48 of the pivot bearing 44. The instrument rotator 60 is equipped with a motor mechanism for generating torque and a transmission mechanism for transmitting the torque. During the course of the telescope 10 tracking the observation target, the image formed at the prime focus may be rotated within the prime focus unit 36. The instrument rotator 60 rotates the auto-guider 56 and the observation apparatus 58 so as to compensate the rotation of the image. Therefore, the observation image is displayed on the monitor that receives an output from the observation apparatus 58 such that the rotation of the image, which is caused during the course of the telescope 10 tracking the observation target, is compensated.

A circular-chain-type cable take-up mechanism 62 is provided above the second frame 42. The cable take-up mechanism 62 houses a cable led from the auto-guider 56 and a cable led from the observation apparatus 58, the auto-guider 56 and the observation apparatus 58 being rotatably disposed within the prime focus unit 36.

Figure 4:
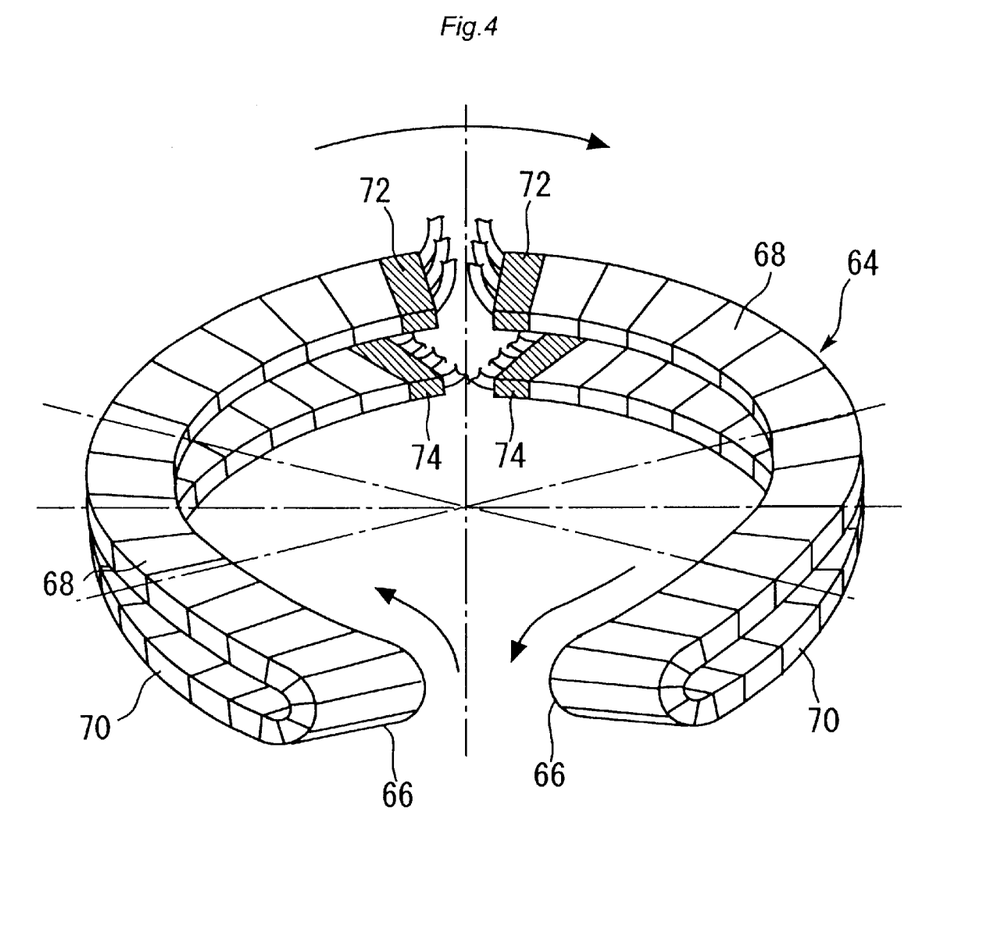
FIG. 4 is a perspective view showing cable housings provided in a cable take-up mechanism equipped to the prime focus unit shown in FIGS. 3A and 3B.

FIG. 4 is a perspective view showing cable housing 64 provided in the cable take-up mechanism 62. The cable housing 64 is a hollow, flexible frame and comprises a movable layer 68 joined to a fixed layer 70 by way of a folded section 66. A movable outlet section 72 is formed at the end of the movable layer 68, and a fixed outlet section 74 is formed at the end of the fixed layer 70. Opposite ends of a cable being conduction within the cable housing 64 are led from the movable outlet section 72 and the fixed outlet section 74, respectively.

The movable layer 68 is rotated about the center axis thereof in the manner of a caterpillar, whereby the cable housing 64 can move only the movable outlet section 72 about the center axis, without involvement of a change in the position of the fixed outlet section 74. The cables led from the movable outlet sections 72 are connected to the auto-guider 56 and the observation apparatus 58 within the prime focus unit 36. The cable connected to the monitor for displaying the observation screen is led from the fixed outlet section 74. Use of the cable take-up mechanism 62 having such a configuration allows rotation of the auto-guider 56 and the observation apparatus 58 without being limited by routing of the cables.

As mentioned above, the prime focus unit 36 is fixed to the barrel top inner tube 26 by means of the clip mechanism 40 mounted on the first frame 38. The primary elements (the optical correction system 52, the auto-guider 56, the observation apparatus 58, and the instrument rotator 60) housed in the prime focus unit 36 are mounted on the second frame 42. The relative position and angle formed between the barrel top inner tube 26 and the observation apparatus 58 are changed according to the relative position and angle formed between the first frame 38 and the second frame 42.

In the embodiment, the first frame 38 and the second frame 42 are joined together by way of a Stewart platform 76. The relative position and angle formed between the barrel top inner tube 26 and the observation apparatus 58 can be appropriately controlled. The configuration and function of the Stewart platform 76 will now be described, by reference to FIG. 5.

Figure 5A:
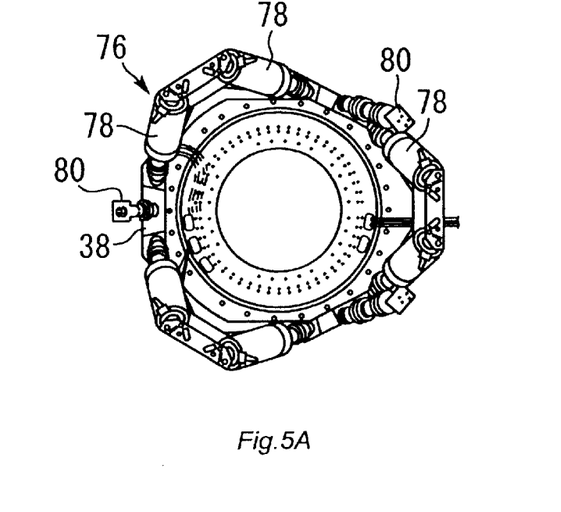
FIG. 5A is a plan view showing the Stewart platform equipped to the prime focus unit shown in FIGS. 3A and 3B.
Figure 5B:
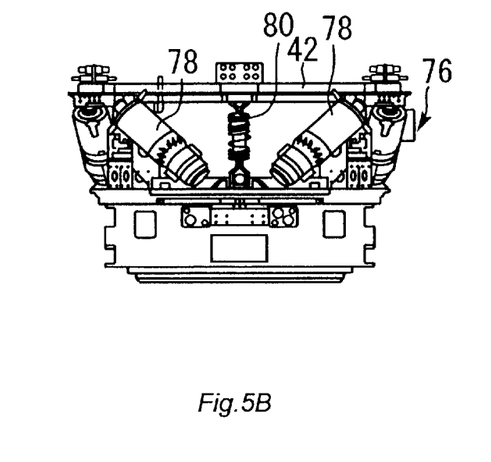
FIG. 5B is a front view of the Stewart platform.
Figure 5C:
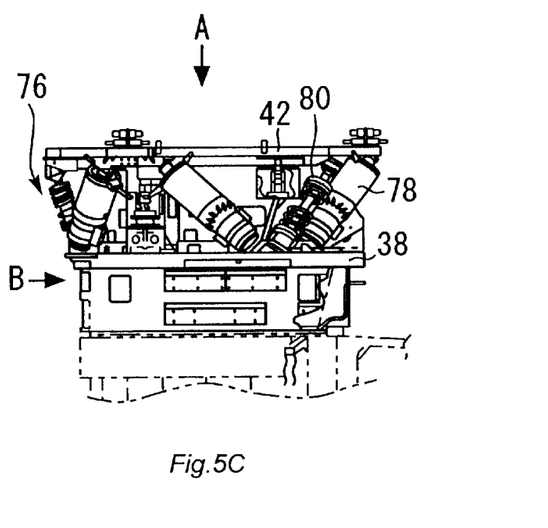
FIG. 5C is a side view of the Stewart platform.

FIG. 5A is a plan view showing the Stewart platform 76 mounted on the first frame 38; FIG. 5B is a front view of the Stewart platform 76; and FIG. 5C is a side view of the same. As shown in these drawings, the Stewart platform 76 is equipped with six jacks 78 and three pressurized springs 80. The positions (X, Y, Z) and angles ($\theta x$, $\theta y$) of the second frame 42 relative to the first frame 38 can be controlled by adjusting the lengths of the six jacks 78. The three pressurized springs 80 are arranged so as to generate pre-loads for eliminating play in the six jacks 78. Thus, the Stewart platform 76 enables free control of the positions and angles of the first and second frames 38 and 42 without involvement of rattling developing therebetween.

As mentioned above, the telescope 10 can assume an attitude corresponding to the desired observation elevation and azimuth, by rotation of the telescope main unit 20 about the azimuth axis 30 as well as about the elevation axis 28. When the attitude of the telescope 10 is changed while the prime focus unit 36 is attached to the barrel top inner tube 26, the direction in which the weight of the prime focus unit 36 acts on the lens barrel is changed. In turn, such a change induces changes in the position and angle of the barrel inner tube 26 disposed in the telescope main unit 20. Further, a change arises in the relative position between the prime focus of the telescope 10 and the observation apparatus 58 of the prime focus unit 36.

In the event that such changes arise, the prime focus unit 36 of the embodiment enables correction, to an appropriate relationship, of the relative position between the prime focus of the telescope 10 and the observation apparatus 58, by adjustment of the Stewart platform 76. Thus, the prime focus unit 36 enables stable collection of observation data at the prime focus of the telescope 10 regardless of the attitude thereof.

Although in the present embodiment the Stewart platform 76 is employed as a mechanism for adjusting the relative position between the first frame 38 and the second frame 42, the present invention is not limited to such a configuration. Any type of mechanism can fulfill the function performed by the Stewart platform, so long as the mechanism enables three-dimensional adjustment of the positions (X, Y, Z) of the second frame 42 with respect to the first frame 38, as well as two-dimensional adjustment of the angles ($\theta x$, $\theta y$) of the second frame 42 with respect to the first frame 38. Such a mechanism can be embodied by combination of known XYZ tables and a known angle control mechanism, for example.

The major benefits of the present invention described above are summarized as follows:

According to the first aspect of the present invention, the relative position and angle between a telescope and an observation apparatus are controlled, by controlling an adjustment mechanism interposed between a first frame and a second frame. Thus, the present invention can eliminate any change in the relative position between the prime focus of the telescope and the position of the observation apparatus arising in association with a change in the attitude of the telescope.

According to the second aspect of the present invention, the position of the second frame is adjusted three-dimensionally by means of the adjustment mechanism, and the angle of the second frame can be adjusted two-dimensionally. Thus, whatever change may arise in the relative position and angle formed between the telescope and the observation apparatus, the change can be eliminated thoroughly.

According to the third aspect of the present invention, use of six jacks ensures six degrees of freedom, and use of pressurized springs enables elimination of rattle arising from play in the jacks. Thus, the present invention enables optimal and accurate adjustment of the relative position and angle between the telescope and the observation apparatus.

According to the fourth aspect of the present invention, the observation apparatus can receive the light originating from stars after the light has been corrected by means of an optical correction system. Further, the optical correction system is fixed on the second frame, and hence the relative positional relationship between an optical correction system and an observation apparatus is always the same. Thus, the present invention enables constant acquisition of accurate observation data.

According to the fifth aspect of the present invention, in a case where a star whose orbit has already been ascertained is situated close to a star which is an object of observation, the light originating from the known star is caught by an auto-guider and can be utilized for tracking the observation target. Since in the present invention the auto-guider is mounted on the second frame, the relative positional relationship between the auto-guider and the observation apparatus can be maintained constant at all times. Thus, the present invention enables accurate tracking of the observation target at all times.

According to the sixth aspect of the present invention, an instrument rotator enables rotation of the observation apparatus. Thus, the present invention can prevent rotation of an observation screen produced by the observation apparatus during the course of the telescope tracking the observation target.

According to the seventh aspect of the present embodiment, cables led from units to be turned by the instrument rotator can be taken up by a circular-type cable take-up mechanism. Accordingly, the present invention enables free rotation of the observation apparatus without involvement of restriction imposed by the cables.

Further, the present invention is not limited to these embodiments, but variations and modifications may be made without departing from the scope of the present invention.

The entire disclosure of Japanese Patent Application No. Hei 11-334513 filed on Nov. 25, 1999 including specification, claims, drawings and summary are incorporated herein by reference in its entirety.

What is claimed is:

1. A prime focus unit mounted at the prime focus of a telescope, for collecting observation data at said prime focus, said unit comprising:

a first frame fixed on the telescope;

an observation apparatus for collecting the observation data;

a second frame on which the observation apparatus is mounted; and an adjustment mechanism which is interposed between the first and second frames and which adjusts the relative position and angle therebetween, wherein said adjustment mechanism enables three-dimensional adjustment of the position of the second frame relative to the first frame, and two-dimensional adjustment of the angle of the second frame relative to the first frame, and wherein said adjustment mechanism corresponds to a Stewart platform comprising six jacks and a plurality of pressurized springs for generating pressure so as to eliminate play in the jacks.

2. A prime focus unit mounted at the prime focus of a telescope, for collecting observation data at said prime focus, said unit comprising:

a first frame fixed on the telescope;

an observation apparatus for collecting the observation data;

a second frame on which the observation apparatus is mounted;

an adjustment mechanism which is interposed between the first and second frames and which adjusts the relative position and angle therebetween;

an auto-guider provided separately from said observation apparatus and fixed on said second frame, which captures light originating from a specific star;

an instrument rotator fixed to said second frame, for rotating said observation apparatus, or both said observation apparatus and said auto-guider, about the axis of the light to be received by the observation apparatus; and a circular-type cable take-up mechanism for housing cables led from units rotated by said instrument rotator.

3. A prime focus unit mounted at the prime focus of a telescope, for collecting observation data at said prime focus, said unit comprising:

a first frame fixed on the telescope;

an observation apparatus for collecting the observation data;

a second frame on which the observation apparatus is mounted;

an adjustment mechanism which is interposed between the first and second frames and which adjusts the relative position and angle therebetween;

an instrument rotator fixed to said second frame, for rotating said observation apparatus about the axis of the light to be received by the observation apparatus; and a circular-type cable take-up mechanism for housing cables led from units rotated by said instrument rotator.

* * * * *